(12) United States Patent
Pautis et al.

(10) Patent No.: US 10,246,196 B2
(45) Date of Patent: Apr. 2, 2019

(54) AIRCRAFT ENGINE ASSEMBLY COMPRISING AT LEAST TWO REAR ENGINE ATTACHMENTS AXIALLY SHIFTED FROM EACH OTHER

(71) Applicant: AIRBUS OPERATIONS (S.A.S.), Toulouse (FR)

(72) Inventors: Olivier Pautis, Merville (FR); Wolfgang Brochard, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 347 days.

(21) Appl. No.: 15/285,211

(22) Filed: Oct. 4, 2016

(65) Prior Publication Data
US 2017/0096229 A1 Apr. 6, 2017

(30) Foreign Application Priority Data
Oct. 5, 2015 (FR) ..................... 15 59474

(51) Int. Cl.
| | | |
|---|---|---|
| *B64D 27/18* | (2006.01) | |
| *B64D 27/26* | (2006.01) | |
| *F02C 7/20* | (2006.01) | |
| *F02K 1/08* | (2006.01) | |

(52) U.S. Cl.
CPC .......... *B64D 27/18* (2013.01); *B64D 27/26* (2013.01); *F02C 7/20* (2013.01); *F02K 1/08* (2013.01)

(58) Field of Classification Search
CPC ........... B64D 27/18; B64D 27/26; F02C 7/20; F02K 1/08
See application file for complete search history.

(56) References Cited

U.S. PATENT DOCUMENTS

| | | | | |
|---|---|---|---|---|
| 5,303,880 A | * | 4/1994 | Cencula ................. | B64D 27/26 244/54 |
| 5,320,307 A | * | 6/1994 | Spofford ................ | B64D 27/18 244/54 |
| 5,620,154 A | * | 4/1997 | Hey ....................... | B64D 27/18 244/54 |
| 5,873,547 A | * | 2/1999 | Dunstan ................. | B64D 27/18 244/54 |

(Continued)

FOREIGN PATENT DOCUMENTS

| | | |
|---|---|---|
| EP | 2103516 | 9/2009 |
| FR | 3014841 | 9/2009 |
| FR | 2987401 | 8/2013 |

OTHER PUBLICATIONS

French Search Report for Application No. 1559474 dated Jul. 25, 2016.

*Primary Examiner* — Michael H Wang
(74) *Attorney, Agent, or Firm* — Jenkins, Wilson, Taylor & Hunt, P.A.

(57) ABSTRACT

In order to reduce the width of the attachment between the rear portion of an aircraft engine and its attachment pylon, an engine assembly attachment include an assembly of rear engine attachments comprising a first connecting rod laid out in a longitudinal and median vertical plane, a second connecting rod substantially laid out tangentially to the inter-turbine case, and a rear engine attachment for transversely spreading the loads, axially shifted rearwards relatively to the first and second connecting rods, and comprising a shear pin oriented along a vertical direction of the engine assembly.

15 Claims, 5 Drawing Sheets

(56) References Cited

U.S. PATENT DOCUMENTS

| | | | | |
|---|---|---|---|---|
| 6,758,438 B2* | 7/2004 | Brefort | ............... | B64D 27/26 |
| | | | | 244/54 |
| 6,843,449 B1* | 1/2005 | Manteiga | ............... | B64D 27/26 |
| | | | | 244/54 |
| 8,141,817 B2* | 3/2012 | Baillard | ............... | B64D 27/26 |
| | | | | 244/53 R |
| 8,328,133 B2* | 12/2012 | Suciu | ............... | B64D 27/26 |
| | | | | 244/54 |
| 8,413,925 B2* | 4/2013 | Martinou | ............... | B64D 27/26 |
| | | | | 244/54 |
| 8,727,268 B2* | 5/2014 | Combes | ............... | B64D 27/26 |
| | | | | 244/54 |
| 8,740,136 B2* | 6/2014 | Audart-Noel | ............... | B64D 27/26 |
| | | | | 244/54 |
| 8,979,491 B2* | 3/2015 | Heyerman | ............... | B64D 27/20 |
| | | | | 248/554 |
| 8,985,509 B2* | 3/2015 | Sandy | ............... | B64D 27/26 |
| | | | | 244/54 |
| 9,527,599 B2* | 12/2016 | Deforet | ............... | B64D 27/26 |
| 9,701,412 B2* | 7/2017 | Stretton | ............... | B64D 27/26 |
| 9,834,312 B2* | 12/2017 | Beaujard | ............... | F01D 25/28 |
| 2011/0290934 A1* | 12/2011 | Journade | ............... | B64D 27/00 |
| | | | | 244/54 |
| 2015/0047370 A1 | 2/2015 | Beaujard et al. | | |
| 2015/0166192 A1* | 6/2015 | Ewens | ............... | B64D 27/26 |
| | | | | 244/54 |

\* cited by examiner

AIRCRAFT ENGINE ASSEMBLY COMPRISING AT LEAST TWO REAR ENGINE ATTACHMENTS AXIALLY SHIFTED FROM EACH OTHER

CROSS-REFERENCE TO RELATED APPLICATION

This application claims priority to French Patent Application FR 15 59474 filed Oct. 5, 2015, the entire disclosure of which is incorporated by reference herein.

TECHNICAL FIELD

The present disclosure relates to aircraft engine assemblies comprising a pylon for mounting the engine on a structure of the aircraft, preferably beneath a wing of the aircraft.

The present disclosure relates more specifically to an engine assembly in which a rear engine attachment links the primary structure of the pylon to an inter-turbine casing of the engine.

The present disclosure applies preferably to commercial airplanes.

BACKGROUND

On existing aircraft, engines such as dual-flow dual-body turbojet engines are suspended beneath the wing system by complex mounting systems referred to as engine mounting structures (EMS) or mounting pylons. The mounting pylons normally used have a rigid structure referred to as the primary structure. This primary structure usually forms a box, i.e. it is formed by assembling lower and upper longerons connected together by a plurality of stiffening transverse ribs positioned inside the box. The longerons are arranged on the lower and upper faces, while the side panels close the lateral faces of the box.

In a known manner, the primary structure of these pylons is designed to enable the static and dynamic forces generated by the engines—such as weight, thrust and other dynamic forces—to be transmitted to the wing structure.

In the solutions known in the prior art, the transmission of forces between the engine and the primary structure is conventionally ensured using mounting means comprising a front engine attachment, a rear engine attachment and a thrust spreading device. These elements together form an isostatic attachment system comprising primary attachments to cover nominal operating conditions and secondary attachments to cover operation in the event of failures/faults, also referred to as failsafe cases.

Normally, the rear engine attachment links the primary structure to the exhaust casing of the engine, also referred to as the gas exhaust casing, which is located at the rear end of this engine. A conventional example embodiment of the rear engine attachment is shown in FIG. 1 and disclosed in patent application FR 3 014 841.

This rear engine attachment 7a therefore links the exhaust casing of the engine to the primary structure 6 of the box-shaped mounting pylon. To do so, the attachment 7a comprises a body 100 and a plurality of connecting rods 102 articulated with the engine attachment body 100 and with the clevises on the exhaust casing. More specifically, the body 100 has one or more cross members 104, 106 stacked vertically. The three connecting rods 102 are spaced out transversally, which results in the overall width of the rear engine attachment being relatively large.

It has recently been proposed to install the rear engine attachment level with the inter-turbine casing of the engine, with a view to reducing the deformations of this latter. Limiting such deformations helps to better control blade-tip clearance in high- and low-pressure turbines, and helps to improve overall performance of the engine. Indeed, the fact of moving the rear engine attachment forwards from the exhaust casing towards the inter-turbine casing makes it possible to arrange this attachment in a zone in which the inner aerodynamic fairings of the nacelle, or inner fixed structure (IFS), are wider and therefore facilitate better aerodynamic integration.

However, for this type of installation on the inter-turbine casing, the rear engine attachment usually has a design similar to the one shown in FIG. 1. Consequently, the significant width of same is liable to require the overdimensioning of one or more of the structures inside the nacelle flow path, some of which are intended to streamline the rear engine attachment. Such overdimensioning increases the size of the rear attachment or rear mount fairing (RMF), which may take the form of local enlargements around the two lateral ends of the rear engine attachment, causing aerodynamic disturbances that have an adverse effect on the overall performance of the engine.

SUMMARY

The present disclosure is therefore intended to disclose an aircraft engine assembly that at least partially overcomes the aforementioned problems found in the prior art solutions.

To do so, the present disclosure relates to an aircraft engine assembly comprising:

a dual-body engine comprising an inter-turbine casing, a pylon for mounting the engine on a structure of the aircraft, the pylon including a primary structure, a mount for mounting the engine on the primary structure of the mounting pylon, the mount comprising a system of isostatic or hyperstatic attachments, the system of isostatic attachments being preferred.

According to the present disclosure, the mount includes a rear engine attachment assembly comprising:

a first connecting rod articulated at one of the ends of same with a bracket rigidly connected to the inter-turbine casing and articulated at the other end with a bracket rigidly connected to the primary structure of the pylon, the first connecting rod being arranged in a median vertical and longitudinal plane;

a second connecting rod articulated at one of the ends of same with a bracket rigidly connected to the inter-turbine casing and articulated at the other end with a bracket rigidly connected to the primary structure of the pylon, the second connecting rod being arranged substantially tangential to the inter-turbine casing; and a rear engine attachment for transverse force spreading, shifted axially backwards in relation to the first and second connecting rods, and including a shear pin oriented in a vertical direction of the engine assembly and rigidly connected to either the engine or the primary structure, as well as a seating bracket for the shear pin that is rigidly connected to the other of the elements and that has a seating orifice for the shear pin, the shear pin being seated in the seating orifice with a clearance in the longitudinal direction of the engine assembly.

Thus, the mount of the rear portion of the engine is split into several engine attachments that are preferably split between two or three parallel planes normal to the longitudinal axis of the engine. A rear plane including a shear pin is shifted axially along the longitudinal axis of the front plane (or of the front planes) including the first and second connecting rods. This novel distribution of attachments between several axially shifted planes advantageously reduces the overall width of this rear engine attachment assembly. This in turn reduces the width of the surrounding secondary structures, thereby increasing the overall performance of the engine.

Furthermore, the rear attachments are simplified, resulting in a reduction in mass. Also with a view to reducing overall mass, simple connecting rods are used between the primary structure and the inter-turbine casing, which obviates the need for an intermediate structure attached between the primary structure of the pylon and the inter-turbine casing, as in the prior art.

The present disclosure incorporates at least one of the following optional features, individually or in combination.

According to a first embodiment, the first and second connecting rods are arranged in the same transverse plane of the engine assembly.

According to a second embodiment, the first and second connecting rods are arranged respectively in two different transverse planes of the engine assembly. In this case, it is possible that, when viewed axially, the first and second connecting rods cross one another to further reduce the overall transverse width of the rear engine attachment assembly.

Each of the first and second connecting rods is associated with an emergency connecting rod that is only stressed in the event of the related connecting rod suffering an accident.

The shear pin is seated movably in vertical translation in the seating orifice, and the free end of the pin is provided with vertical stopping member arranged vertically distant from a complementary stopping member rigidly connected to the primary structure. The arrangement provides a failsafe function for spreading forces in the vertical direction in the event of damage being caused to the first and second connecting rods, for example in the event of rotor break-up, the objective then being to keep the rear portion of the engine on the airplane (to withstand the weight and dynamic forces).

The primary structure of the mounting pylon is in the form of a box fitted with a lower longeron, the vertical stopping member is positioned inside the box, and the complementary stopping member is formed by the lower longeron.

The rear engine attachment for transverse force spreading is positioned on an exhaust casing of the engine, although a more forward position towards the connecting rods is possible without thereby moving outside the scope of the present disclosure.

The shear pin is preferably rigidly connected to the engine, although it may alternatively be rigidly connected to the primary structure of the pylon.

The shear pin comprises:
a base;
a vertical shaft rigidly connected to the base;
a male ball-joint element formed on the vertical shaft;
an outer bearing member inside the pin seating orifice; the outer member having an inner surface defining a female ball-joint element cooperating with the male element.

The mount also has a front engine attachment, as well as a thrust spreading device oriented in the longitudinal direction of the engine assembly.

The rear engine attachment, the front engine attachment and the thrust spreading device thus make up the mount of the engine, forming an isostatic force-spreading system.

The thrust spreading device comprises:
a supporting element attached to the primary structure;
two thrust-spreading lateral link rods; and
a swing bar articulated with the supporting element, both lateral link rods being articulated with the two opposite ends of the swing bar respectively.

The supporting element is positioned in front of the first and second connecting rods.

The present disclosure also relates to an aircraft including at least one such engine assembly.

Other advantages and features of the present disclosure are set out in the non-limiting detailed description given below.

BRIEF DESCRIPTION OF THE DRAWINGS

This description is made with reference to the attached drawings, in which.

DETAILED DESCRIPTION

Figure 1:
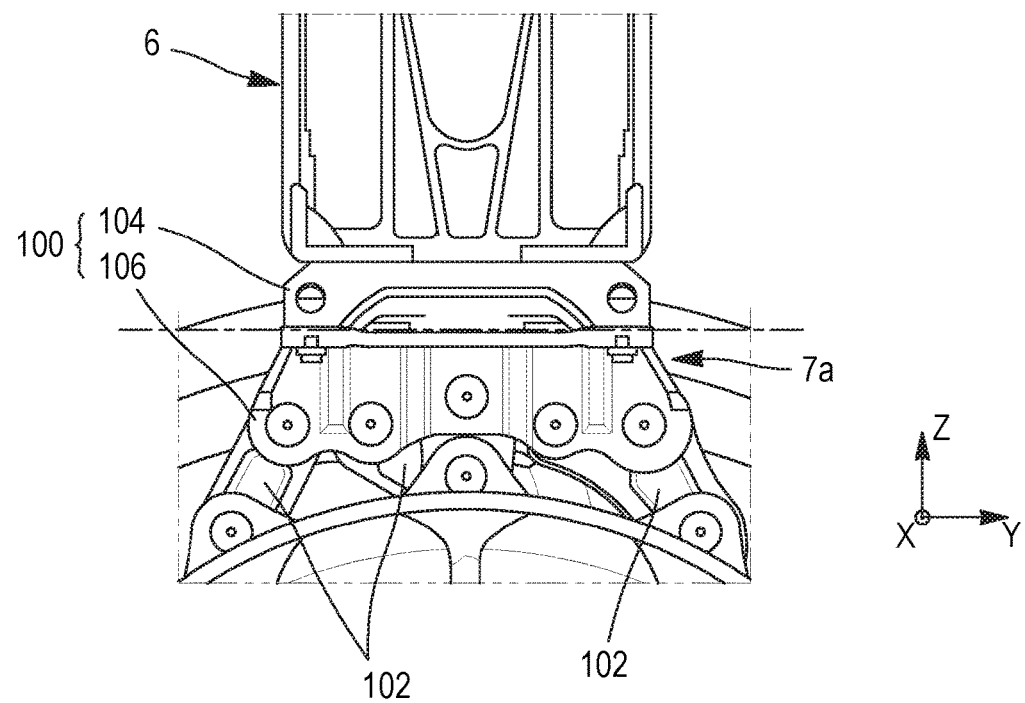
FIG. 1, as described above, shows an aircraft engine assembly according to the prior art including a mounting pylon and a rear engine attachment.
Figure 2:
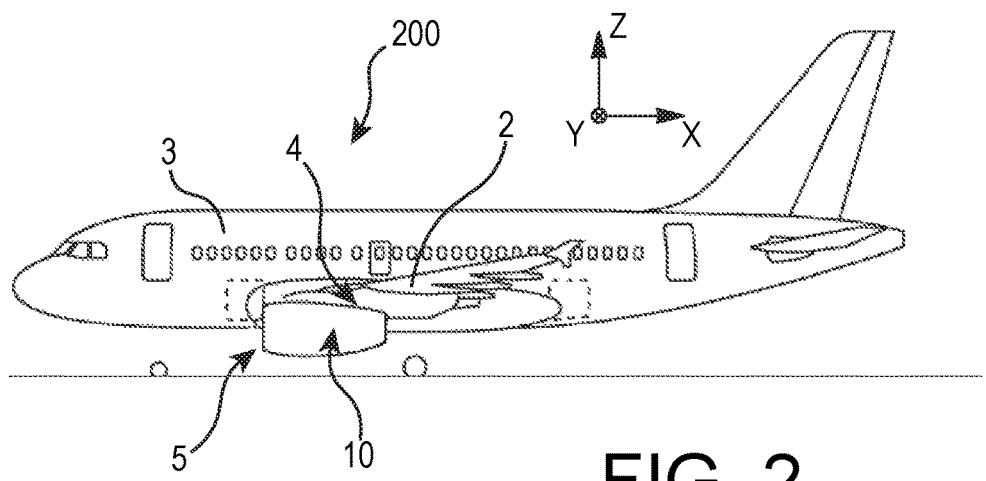
FIG. 2 shows an aircraft fitted with an engine assembly according to the present disclosure.

FIG. 2 shows an aircraft 200 including a fuselage 3 to which are attached two wing system elements 2 (only one visible in FIG. 2), each wing system element bearing an engine assembly 5 according to the present disclosure. This engine assembly 5 includes a dual-flow dual-body engine 10, such as a turbojet, and a mounting pylon 4 for the engine 10.

Figure 3:
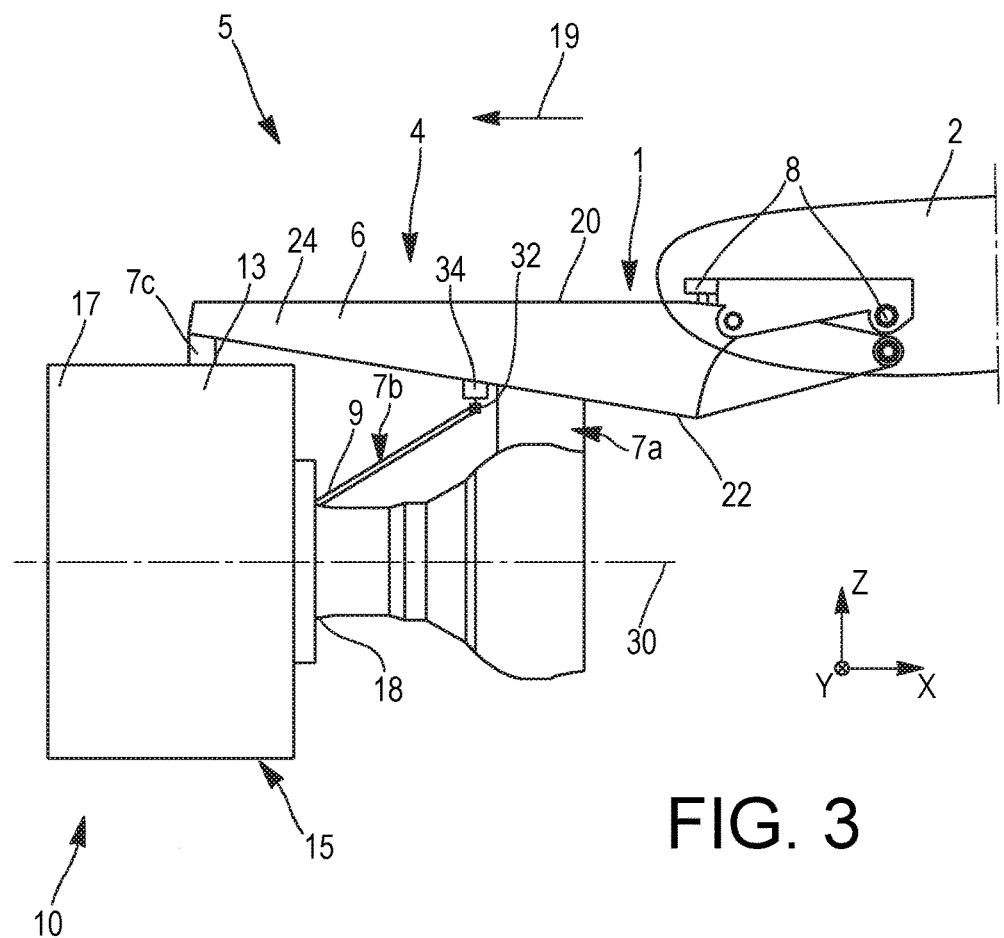
FIG. 3 is a schematic side view of the engine assembly shown in the previous figure, according to the present disclosure.
Figure 4:
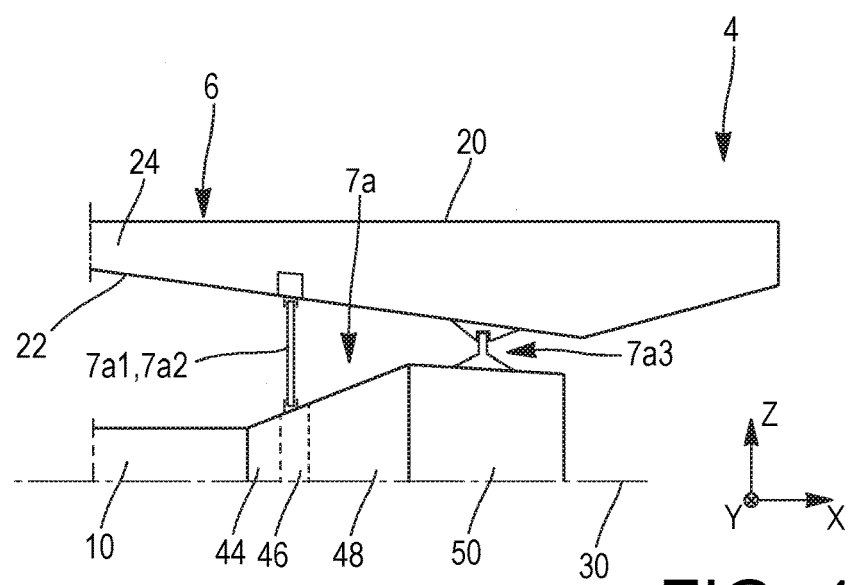
FIG. 4 is a more detailed side view of the rear engine attachment assembly shown in the previous figure.
Figure 5:
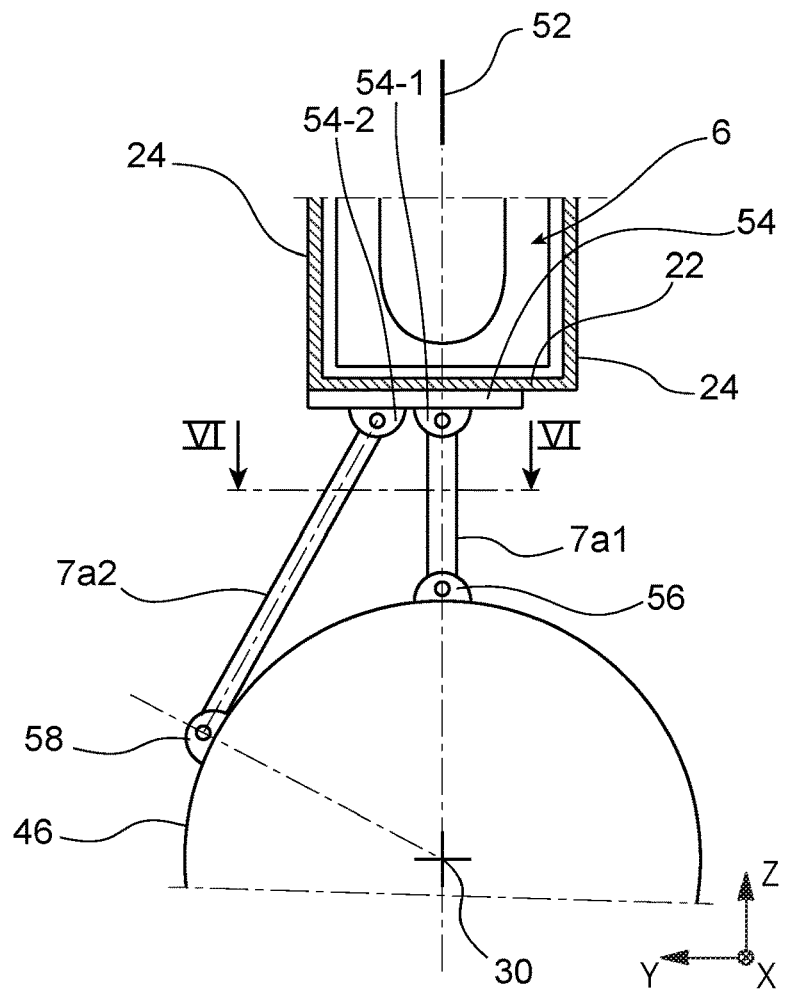
FIG. 5 is an axial front view of the first and second connecting rods forming an integral part of the rear engine attachment assembly shown in FIG. 4.

FIG. 3 shows one of the engine assemblies 5 in greater detail. The wing system elements 2, the turbojet engine 10 and the mounting pylon 4 are shown. Furthermore, mounts 8 for the pylon 4 are provided on the wing system element 2, and mounts 7a, 7b, 7c for the turbojet 10 are provided on the pylon. These mounts 7a, 7b, 7c, the pylon 4 and the turbojet 10 form the engine assembly 5 according to the present disclosure.

The mounts 8, located at the interface between the pylon 4 and the wing system element 2, is formed in a conventional manner. As a result, they shall not be described in further detail.

The mounts 7a-7c are formed by a rear engine attachment assembly 7a, a thrust spreading device 7b, and a front engine attachment 7c. In this regard, it can be seen that the front end of the primary structure 6 of the pylon, also referred to as the primary structure, is attached using the front engine attachment 7c to an external shroud 13 of an intermediate casing 15 of the turbojet 10. This shroud 13 forms a rearward axial extension of the fan casing 17 of substantially the same diameter. Alternatively, the front engine attachment 7c may be attached to the compressor casing 18 closer to the longitudinal axis 30 of the turbojet 10.

In the remainder of the description, the direction X shall correspond to the longitudinal/axial direction of the pylon 4, which is also similar to the longitudinal direction of the turbojet 10 and of the engine assembly 5. This direction X is parallel to the longitudinal axis 30 of this turbojet 10. Furthermore, the direction Y corresponds to the direction oriented transversely in relation to the mast 4 and also similar to the transverse direction of the turbojet 10 and of the engine assembly 5, while the direction Z corresponds to the vertical direction or height. These three directions X, Y and Z are mutually orthogonal and form a right trihedron.

Furthermore, the terms "front" and "rear" shall be understood in relation to the direction of forward movement of the aircraft following the thrust exerted by the turbojets 10, this direction being represented schematically by the arrow 19.

FIG. 3 shows only the primary structure 6 of the mounting pylon 4. All of the component parts of this pylon 4 that have not been shown, specifically secondary structures ensuring the segregation and attachments of systems while carrying the aerodynamic fairings, are elements known in the prior art. Consequently, no detailed description shall be made thereof.

The primary structure 6 is usually made up of a "box", i.e. formed by assembling upper and lower longerons 20, 22 and two side panels 24 (only one being visible due to the side view), these elements 20, 22, 24 being connected together by internal stiffening transverse ribs (not shown), which are usually oriented along the parallel planes YZ. These ribs are preferably uniformly distributed inside the box 6 in the direction X. Other embodiments of the primary structure are nonetheless possible without thereby moving outside the scope of the present disclosure.

With reference to the mounts 7a-7c, the thrust spreading device 7b is also formed in a conventional manner using two lateral link rods 9 designed to spread forces in the direction X. These link rods 9 are arranged symmetrically about a median plane XZ of the engine assembly 5. The link rods are articulated at the front end with an internal shroud of the intermediate casing 15, and are articulated at the rear end respectively with the two opposing lateral ends of a swing bar 32. The swing bar 32 is in turn articulated at the center of same with a supporting element 34 that is attached beneath the lower longeron 22 of the primary structure 6.

The supporting element 34 is located in front of and close to the rear engine attachment assembly 7a, which links the casing of the turbojet 10 to the lower longeron 22.

The design of the rear engine attachment assembly 7a is given below with reference to FIGS. 4 to 7. The assembly comprises three separate attachments, specifically a first connecting rod 7a1, a second connecting rod 7a2, and a rear engine attachment 7a3 for transverse force spreading.

The rear portion of the engine that cooperates with these attachments 7a1, 7a2, 7a3 has, from front to back, a high-pressure turbine casing 44, an inter-turbine casing 46, a low-pressure turbine casing 48, and an exhaust casing 50.

The first connecting rod 7a1 is arranged in a medium vertical and longitudinal plane 52 of the engine assembly 5, and is preferably oriented in the direction Z to spread only the forces exerted in this vertical direction. The upper end of same is articulated with a bracket 54 attached statically to the lower longeron 2 of the primary structure 6, and more specifically is articulated with a clevis 54-1 provided on the bracket. The lower end of same is articulated with a clevis-shaped bracket 56 attached statically to or formed as a single part with the inter-turbine casing 46.

The second connecting rod 7a2 is arranged substantially tangential to the inter-turbine casing 46, and is preferably arranged in a transverse plane XZ. From an axial view such as the one shown in FIG. 5, the angles of inclination between the second connecting rod 7a2 and each of the two directions Y and Z is for example around 20° to 70°.

The upper end of the second connecting rod is articulated with the bracket 54 at a point different to that of the first connecting rod 7a1, and more specifically is articulated with a clevis 54-2 also provided on the bracket. The lower end of same is in turn articulated with a clevis-shaped bracket 58 attached statically to or formed as a single part with the inter-turbine casing 46.

On account of the substantially tangential arrangement of same, the second connecting rod 7a2 is provided exclusively to spread the moment exerted in the direction X.

The joints of the connecting rods 7a1, 7a2 are made using jointing members oriented in the direction X. These jointing members are preferably doubled up to deal with accident conditions, thereby providing the failsafe function in the event of failure of the jointing members active during normal operating conditions.

Figure 6:
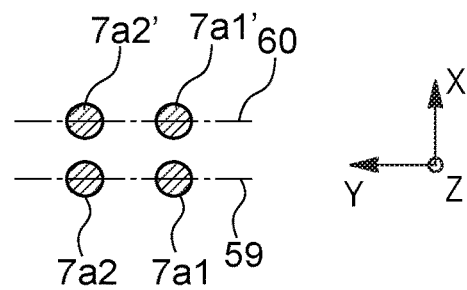
FIG. 6 is a cross section taken along the line VI-VI in FIG. 5.

Each of the two connecting rods 7a1, 7a2 may also be doubled up, also for safety reasons. More specifically, FIG. 6 shows how a first emergency connecting rod 7a1' may be associated with the first connecting rod 7a1. This first emergency connecting rod is mounted such that it is inactive under normal operating conditions, but is able to spread the vertical forces in the event of an accident occurring to the first connecting rod 7a1. Similarly, and also with a view to providing the failsafe function, a second emergency connecting rod 7a2' may also be associated with the second connecting rod 7a2. The second emergency connecting rod is mounted such that it is inactive under normal operating conditions, and stressed in order to spread the moment exerted in the direction X in the event of an accident occurring to the second connecting rod 7a2.

The connecting rods 7a1, 7a2 are therefore preferably arranged in a first transverse plane YZ 59 of the engine assembly 5, while the emergency connecting rods 7a1', 7a2' are preferably arranged in a second transverse plane YZ 60, located very close axially to the first plane 59. Preferably, the connecting rods 7a1, 7a1', 7a2, 7a2' are arranged so as to be perfectly superposed in pairs when viewed axially.

The rear transverse spreading attachment 7a3 is positioned axially behind the connecting rods 7a1, 7a2. It attaches the exhaust casing 50 to a rear end of the lower longeron 22 of the primary structure 6, in a small vertical gap or space between the turbojet 10 and the primary structure 6 of the pylon. This attachment 7a3 is designed exclusively to spread the forces exerted in the direction Y. The attachment is traversed symmetrically by the median plane 52, as shown more clearly in FIG. 7.

This figure shows an example design of the attachment 7a3. It includes a shear pin 64 oriented in the vertical direction Z and mounted statically on the exhaust casing 50. This attachment, which is a spigot attachment, also includes a bracket 66 for seating the shear pin, that is attached statically to the lower longeron 22 of the box 6 and outside the latter. This bracket 66 is provided with a seating orifice 68 for the shear pin 64.

The shear pin 64 is preferably formed of several elements, which are described below. Firstly there is a base 70 used for attachment to the exhaust casing 50, and a vertical shaft 72 preferably formed as a single part with the base 70. This shaft 72 is formed to define a male ball-joint element 74 by a spherical outer shape.

Furthermore, an outer member 76 completes this shear pin 64. This is a bearing member inside the seating orifice 68, that has an inner surface defining a female ball-joint element 78 cooperating with the male element 74.

The outer bearing member 76 is in contact with the wall of the seating orifice 68 in the direction Y. Conversely, a clearance 81 is provided between these two elements 68, 76 in the direction X to ensure that force is only transmitted in the direction Y, since the presence of the ball-joint elements 74, 78 also filters out spurious moments.

Figure 7:
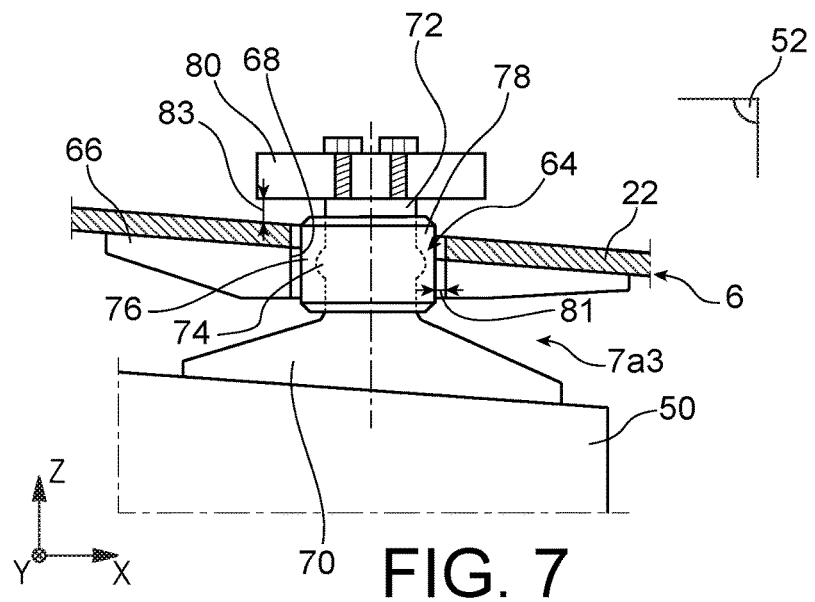
FIG. 7 is a side view of the rear engine attachment for transverse force spreading, forming an integral part of the rear engine attachment assembly shown in FIG. 4.

To provide a failsafe function related to the attachment 7a3, instead of being made of a single part, the base 70 and the vertical shaft 72 may be made of two symmetrical parts attached to one another, as shown in FIG. 7.

Furthermore, a failsafe function in the direction Z may also be associated with this attachment 7a3. Indeed, the free end of the vertical shaft 72 located inside the box 6 is provided with a vertical stopping member 80 that is for example in the form of a nut. This member 80 is arranged vertically distant from the lower longeron 22, which forms a complementary stopping member. Consequently, under normal operating conditions, the spreading of forces in the direction Z by the attachment 7a3 is not active on account of the vertical gap between the stopping member 80 and the lower longeron 22. Conversely, in the event of an accident occurring to the connecting rods 7a1, 7a1', since the outer bearing element 76 of the pin 64 is mounted movably in vertical translation in the seating orifice 68, the vertical clearance 83 is closed until the elements 80, 22 come into contact. The latter may also spread forces in the vertical direction Z.

Figure 8:
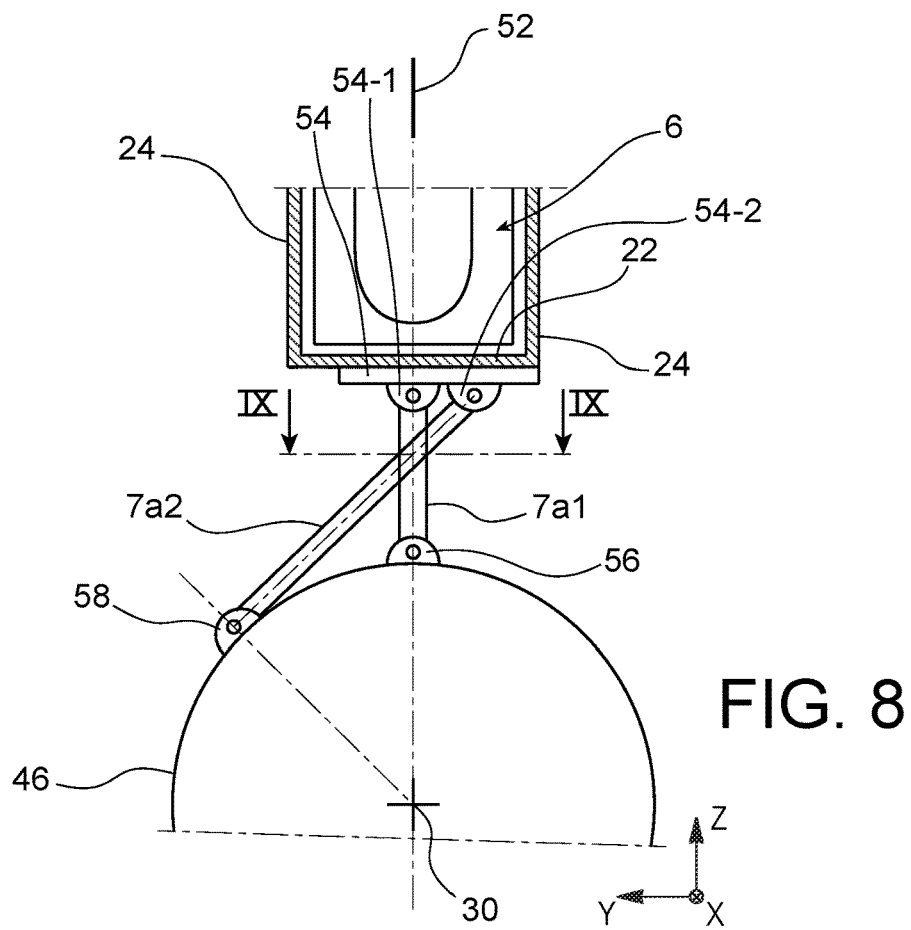
FIG. 8 is an axial front view of the first and second connecting rods according to another embodiment of the present disclosure.
Figure 9:
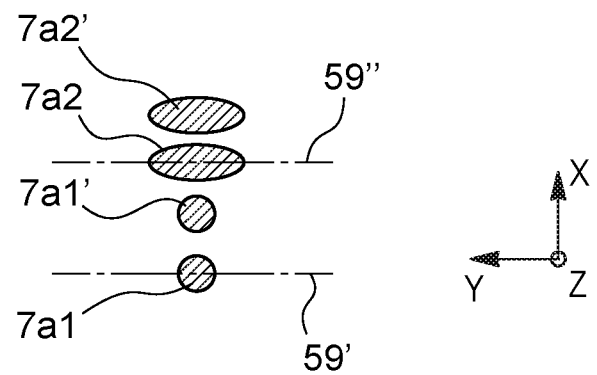
FIG. 9 is a cross section taken along the line IX-IX in FIG. 8.

According to another preferred embodiment further reducing the transverse footprint related to the two connecting rods 7a1, 7a2, these latter cross one another when viewed axially, as shown in FIG. 8. To achieve this, these two connecting rods are arranged in different transverse planes YZ that are spaced out axially. Again in this case, the connecting rods 7a1, 7a2 arranged in the transverse planes 59', 59" may be doubled up to provide the failsafe function, as shown in FIG. 8.

Figure 10:
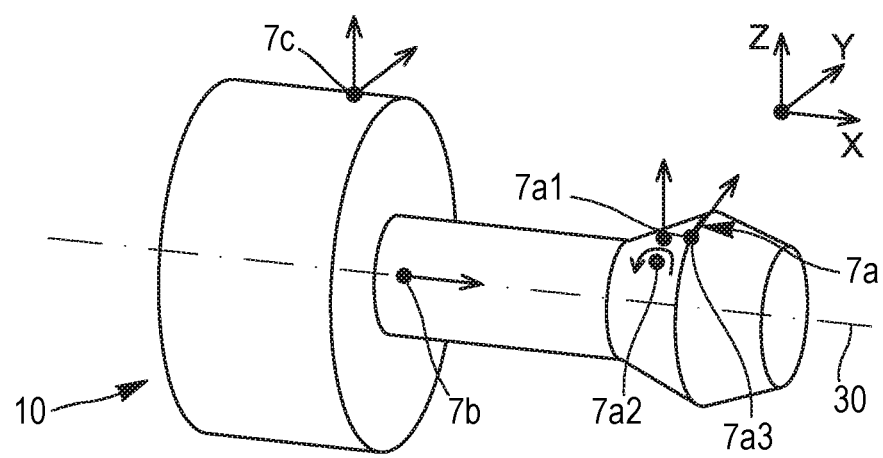
FIG. 10 is a schematic perspective view showing the force spreading by the mount of the engine on the pylon.

The mounts 7a-7c described above are the only elements in the engine assembly 5 that transfer loads between the turbojet 10 and the primary structure of the pylon. They form an isostatic force-spreading system under normal operating conditions. Indeed, as shown schematically in FIG. 10, the front engine attachment 7c only spreads forces in the directions Y and Z, while the device 7b only spreads forces in the direction X. In the rear engine attachment 7a, which is split into three separate attachments, the first connecting rod 7a1 only spreads forces in the direction Z, while the attachment 7a3 only spreads forces in the direction Y.

Moreover, the forces exerted in the direction X are spread using the device 7b, the forces exerted in the direction Y are spread using the front engine attachment 7c, the second connecting rod 7a2 and the rear attachment 7a3, while the forces exerted in the direction Z are spread jointly using the front engine attachment 7c and the first connecting rod 7a1.

Furthermore, the moment exerted along the axis X is spread using the force components oriented in the directions Y and Z using the three attachments formed by the first connecting rod 7a1, the second connecting rod 7a2 and the rear attachment 7a3, the moment exerted in the direction Y is spread using the force components oriented in the direction Z using the two attachments formed by the first connecting rod 7a1 and the front engine attachment 7c, and the moment exerted in the direction Z is spread using the force components oriented in the direction Y using the two attachments formed by the rear attachment 7a3 in combination with the front engine attachment 7c.

Naturally, a person skilled in the art may make different modifications to the present disclosure described above purely by way of non-limiting example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly comprising:
a dual-body engine comprising an inter-turbine casing;
a pylon for mounting the engine on a structure of the aircraft, the pylon including a primary structure;
a mount for mounting the engine on the primary structure of the mounting pylon;
the mount comprising a rear engine attachment assembly comprising:
a first connecting rod articulated at one end with a bracket rigidly connected to the inter-turbine casing and articulated at another end with a bracket rigidly connected to the primary structure of the pylon, the first connecting rod being arranged in a median vertical and longitudinal plane;
a second connecting rod articulated at one end with a bracket rigidly connected to the inter-turbine casing and articulated at another end with a bracket rigidly connected to the primary structure of the pylon, the second connecting rod being arranged substantially tangential to the inter-turbine casing; and
a rear engine attachment for transverse force spreading, shifted axially backwards in relation to the first and second connecting rods, and including a shear pin oriented in a vertical direction of the engine assembly and rigidly connected to either the engine or the primary structure, as well as a seating bracket for the shear pin that is rigidly connected to another of the engine or the primary structure and that has a seating orifice for the shear pin, the shear pin being seated in the seating orifice with a clearance in the longitudinal direction of the engine assembly.

2. The engine assembly according to claim 1, wherein the first and second connecting rods are arranged in a same transverse plane of the engine assembly.

3. The engine assembly according to claim 1, wherein the first and second connecting rods are arranged respectively in two different transverse planes of the engine assembly.

4. The engine assembly according to claim 3, wherein, when viewed axially, the first and second connecting rods cross one another.

5. The engine assembly according to claim 1, wherein each of the first and second connecting rods is associated with an emergency connecting rod that is only stressed in an event of a connecting rod suffering an accident.

6. The engine assembly according to claim 1, wherein the shear pin is seated movably in vertical translation in the seating orifice, and wherein a free end of the shear pin is provided with a vertical stopping member arranged vertically distant from a complementary stopping member rigidly connected to the primary structure.

7. The engine assembly according to claim 6, wherein the primary structure of the mounting pylon is in a form of a box fitted with a lower longeron, wherein the vertical stopping member is positioned inside the box, and wherein the complementary stopping member is formed by the lower longeron.

8. The engine assembly according to claim 1, wherein the rear engine attachment for transverse force spreading is positioned on an exhaust casing of the engine.

9. The engine assembly according to claim 1, wherein the shear pin is rigidly connected to the engine.

10. The engine assembly according to claim 1, wherein the shear pin comprises:
  a base;
  a vertical shaft rigidly connected to the base;
  a male ball-joint element formed on the vertical shaft;
  an outer bearing member inside the seating orifice, the outer member having an inner surface defining a female ball-joint element cooperating with the male element.

11. The engine assembly according to claim 1, wherein the mount also comprises a front engine attachment, as well as a thrust spreading device oriented in a longitudinal direction of the engine assembly.

12. The engine assembly according to claim 11, wherein the rear engine attachment, the front engine attachment and the thrust spreading device make up the mount of the engine, forming an isostatic force-spreading system.

13. The engine assembly according to claim 11, wherein the thrust spreading device comprises:
  a supporting element attached to the primary structure;
  two thrust-spreading lateral link rods; and
  a swing bar articulated with the supporting element, both lateral link rods being articulated with two opposite ends of the swing bar, respectively.

14. The engine assembly according to claim 13, wherein the supporting element is positioned in front of the first and second connecting rods.

15. An aircraft including at least one engine assembly according to claim 1.

* * * * *